E. A. LAUGHLIN.
VEHICLE BODY BEARING.
APPLICATION FILED JAN. 2, 1917.

1,396,688.

Patented Nov. 8, 1921.
3 SHEETS—SHEET 1.

Witnesses:
C. E. Wessels
A. A. Olm

Inventor.
Elmer A. Laughlin,
By Joshua R. H. Potts
his Attorney.

E. A. LAUGHLIN.
VEHICLE BODY BEARING.
APPLICATION FILED JAN. 2, 1917.
1,396,688.
Patented Nov. 8, 1921.
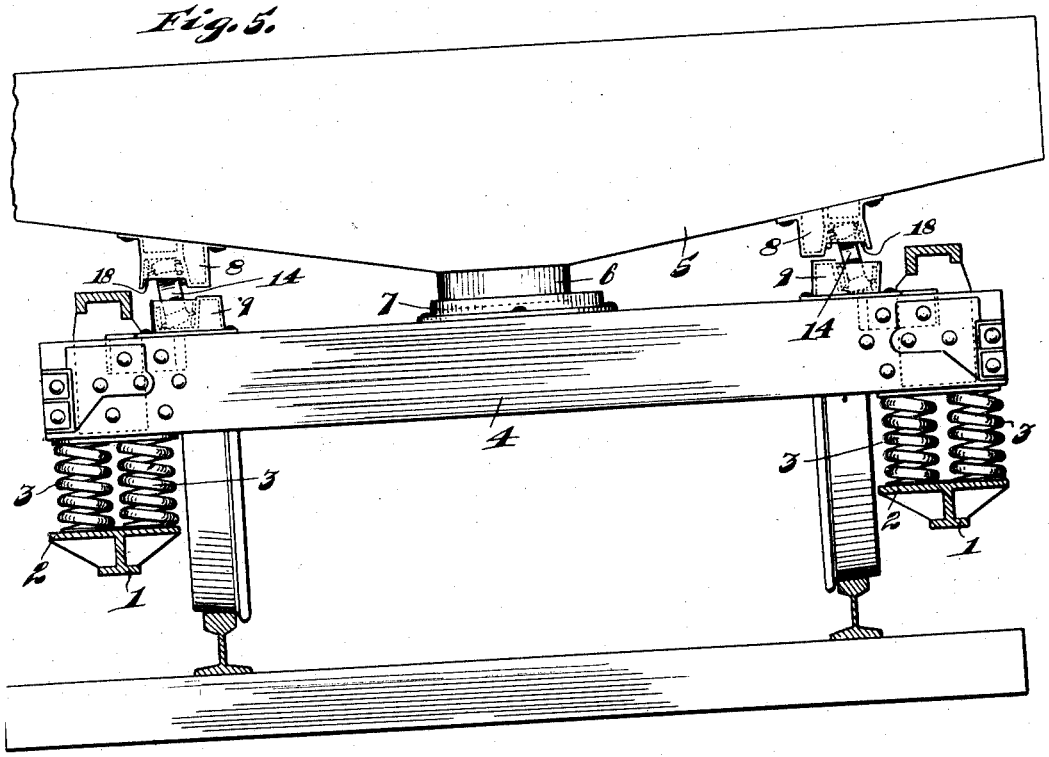
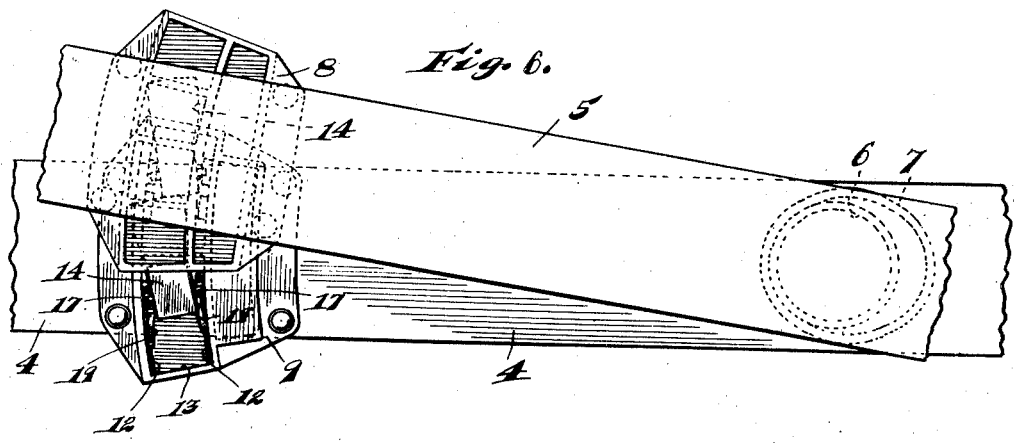

E. A. LAUGHLIN.
VEHICLE BODY BEARING.
APPLICATION FILED JAN. 2, 1917.
1,396,688.
Patented Nov. 8, 1921.
3 SHEETS—SHEET 3.
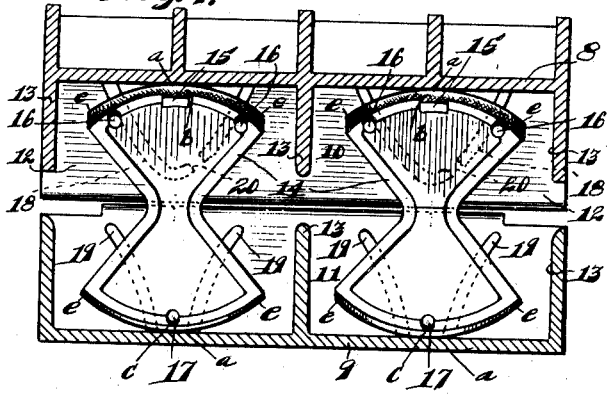
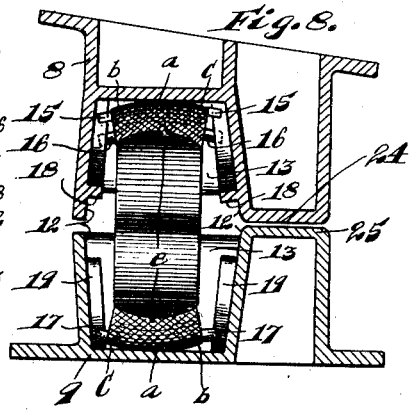
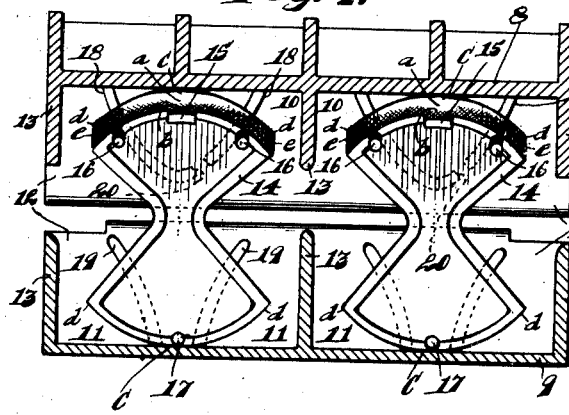
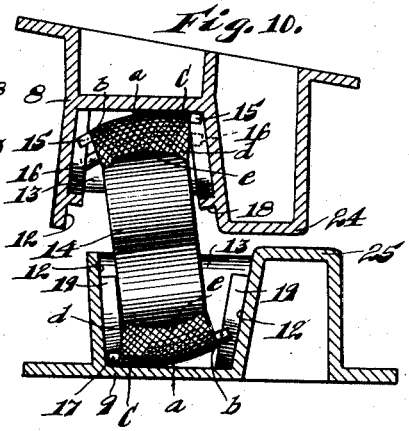
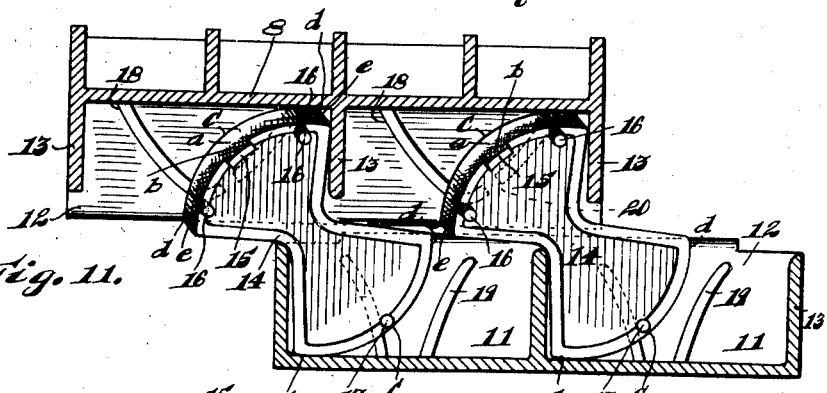
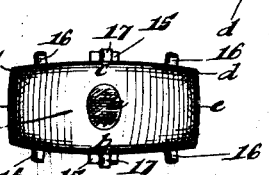

UNITED STATES PATENT OFFICE.

ELMYR A. LAUGHLIN, OF OREGON, ILLINOIS.

VEHICLE-BODY BEARING.

1,396,688. Specification of Letters Patent. Patented Nov. 8, 1921.

Application filed January 2, 1917. Serial No. 140,138.

*To all whom it may concern:*

Be it known that I, ELMYR A. LAUGHLIN, a citizen of the United States, and a resident of the city of Oregon, county of Ogle, and State of Illinois, have invented certain new and useful Improvements in Vehicle-Body Bearings, of which the following is a specification.

My invention relates to improvements in vehicle body bearings and particularly bearings of this type designed for use especially in connection with railway cars.

The object of my invention is the production of a bearing of the character mentioned through the medium of which a car truck will be normally yieldingly held in straight-ahead position, one whereby the elevation of one side or one rail of a track just preceding a curve in the track will be utilized to slightly elevate the body bolster of the car so that when the curve in the track is reached the weight of the car will be utilized to facilitate turning of the truck and, when straight track is again reached, the weight of the car will be utilized also as a means of facilitating turning of the truck to straight-ahead position, thus relieving the tremendous frictional resistance caused by the engagement of the flanges of the wheels of the truck with the sides of the rails, as is the case with car construction now generally in use. A further object is the production of a car bearing, as mentioned, which will be highly efficient in use.

Other objects will appear hereinafter.

The invention consists in the combinations and arrangements of parts hereinafter described and claimed.

Figure 1:
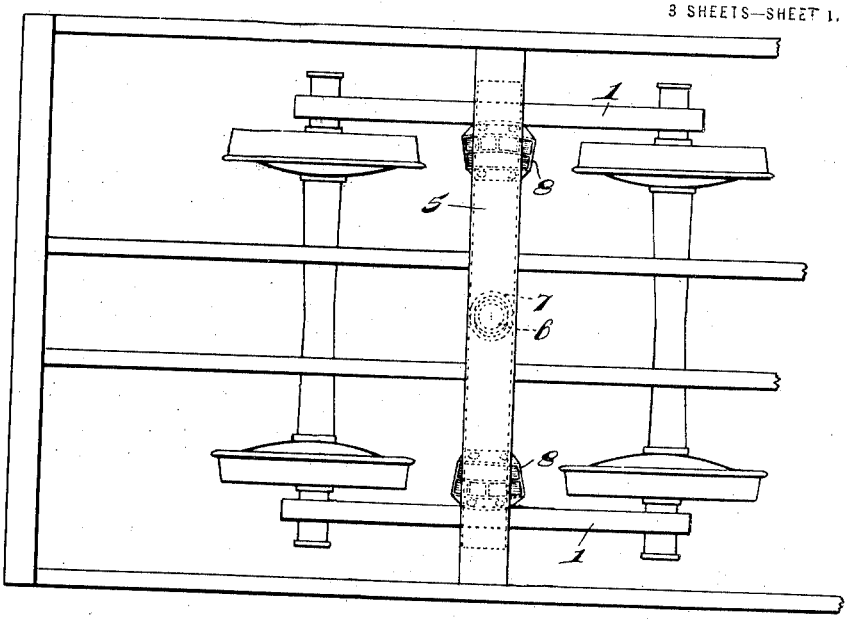

The invention will be best understood by reference to the accompanying drawings forming a part of this specification, and in which, Figure 1 is a plan view of one end of a car body showing the truck beneath and including the improvements constituting this invention.

Figure 2:
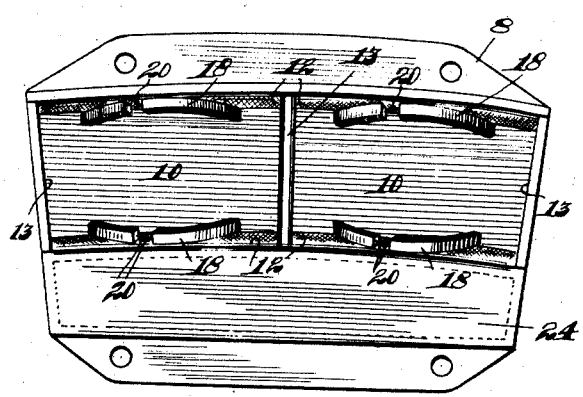

Fig. 2 is an enlarged bottom plan view of one of the bearing members or housings provided upon the body bolster.

Figure 4:
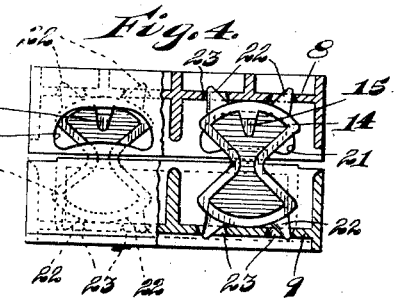
Figure 3:
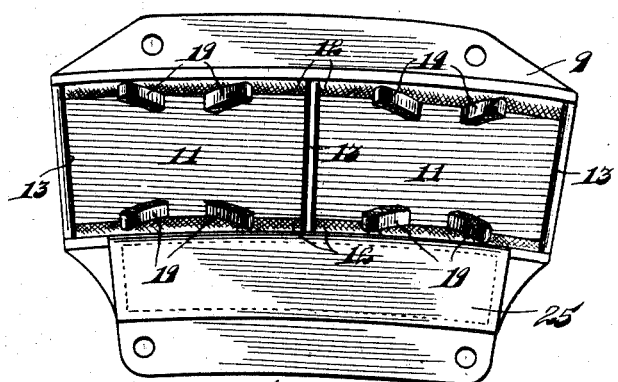

Fig. 3 is an enlarged top plan view of one of the bearing members or housings provided upon the truck bolster, Fig. 4 is a sectional side elevation illustrating one form of the bearing as the parts appear in operative relation, Fig. 5 is a view illustrating the relation of the parts when one side of the car is raised through elevation of one of the track rails, Fig. 6 is a fragmental top plan view of the body and truck bolsters and the bearing arranged between the same, showing the relation of the parts when the body bolster is laterally shifted and the truck bolster turned or pivoted from straight-ahead position, Fig. 7 is a sectional view longitudinally through the bearing illustrating another form of the invention and showing the relation of the parts when the body bolster is in central position and the truck bolster in straight-ahead position, Fig. 8 is a cross section of Fig. 7, Figs. 9 and 10 are views similar to Figs. 7 and 8 respectively, showing the relation of the parts when the body bolster is shifted laterally and with the truck bolster in straight-ahead position, Fig. 11 is a view similar to Fig. 9, showing the relation of the parts when the body bolster is shifted laterally and the truck bolster is turned or pivoted from straight-ahead position, and Fig. 12 is a bottom plan view of one of the bearing rockers detached.

In the construction shown in the drawings the car truck includes the usual side frames 1 upon which the axle journals are mounted. A spring block 2 is supported on each of the side frames and carries the usual cushion springs 3. The springs 3 serve to support the truck bolter 4 above which is arranged the body bolster 5. The body bolster is supported on the truck bolster entirely by means of side bearings, no vertical load being carried by the center bearing which serves to simply guide the pivotal movement of the truck and limit the relative sidewise shifting of the truck and car body. When the load is thus supported on the side bearings, the truck bolster may be made much lighter at the center than is necessary where the load is supported by the center of the bolster, it having been found that with the lighter construction which may be adopted through support of the load upon the side bearings, the truck bolster may be made from four to five-thousand pounds lighter than where the load is supported at the center.

The center bearing comprises a depending circular lug 6 carried centrally at the underside of body bolster 5, said member 6 loosely engaging with a recessed plate 7 secured centrally to the upper side of truck bolster 4, the recesses in plate 7 being elongated, as seen, in order to permit of relative lateral shifting of the truck and body bolsters.

The side bearings which are interposed between the respective ends of the body and truck bolsters are arranged substantially directly above the wheels of the truck, as clearly seen in Figs. 1 and 5. Each of said bearings comprises an upper bearing member or housing 8 secured to the body bolster and a lower bearing member or housing 9 secured to the truck bolster. Said bearing members 8 and 9 are formed with guideways 10 and 11, each of which is inclosed at its sides by side walls 12 and at its ends by end walls 13. Interposed between the bearing members 8 and 9 with their ends engaging in the guideways 10 and 11, are anti-friction bearing members 14 in the form of rockers or rollers with interrupted peripheries. The arrangement is such, as will be seen, that the arcuate engaging surfaces at the upper and lower sides of anti-friction bearing members 14 contact with the bottoms of guideways 10 and 11 and thus serve to bear the load. Said bearing rockers 14 have rolling or rocking contact with said bearing members or housings 8 and 9, the arrangement being such as to permit of relative lateral and longitudinal shifting of said bearing members or housings, said rockers rolling longitudinally or upon transverse axes when said bearing members or housings are moved longitudinally or during relative pivotal movement of the truck bolster, as shown in Fig. 11, and said rockers rolling transversely when said housings are relatively transversely shifted or during relative lateral shifting of the body and truck bolsters, as seen in Figs. 5 and 10. The construction is such also as to permit of relative vertical movement of bearing housings 8 and 9, such as occurs in the tipping or tilting of a car when in use.

In order to prevent displacement of the rockers or anti-friction bearing members 14 from true rolling relation with respect to the bearing housings 8 and 9, when the latter are moved apart or from each other, as just mentioned, each of said rockers in the form shown in Figs. 7 to 11 inclusive, is formed at each side with a plurality of laterally projecting lugs or trunnions, there being a central lug 15 at the upper end and at each side of each rocker and two spaced lugs or trunnions 16 provided at opposite sides of lug 15. At the lower end of each rocker at each side is provided a laterally projecting central lug 17. Formed upon the inner sides of the side walls 12 of each of the runways 10 are guide flanges or trunnion guide forming portions 18 adapted for coöperation with the lugs or trunnions 15 and 16. The lugs 15 are adapted for engagement with the inner sides of flanges 18 and the lugs 16 are adapted for engagement with the outer sides of said flanges. Said flanges are formed to conform with the path of trunnions 16 during rocking or rolling of the rocker, permitting, however, of uninterrupted movement of the same. The lugs or trunnions 15 are normally positioned substantially centrally in guide flanges 18 being adapted, however, upon vertical movement or lifting of the upper bearing housing 8, to engage with said flanges and thus serve to lock the upper ends of the bearing rockers to said housing, to prevent displacement of the same so that upon lowering of said housing to normal position, the rocker bearing will be properly positioned thereunder for operative engagement with the same, the true rolling relation between the two being maintained. The lugs or trunnions 17 provided at the lower end of each rocker bearing coöperates with guide flanges or guideways 19 formed upon the inner sides of side walls 12 of runways 11. Said guide flanges are positioned to conform substantially with the path of trunnions 17 in the longitudinal rocking or rolling of the rocker bearing, permitting of free movement of the same but serving, at the same time, as a means for holding the lower end of the rocker in true rolling relation with the lower bearing member particularly when the bearing rocker is lifted from engagement with the lower bearing plate or housing, as above mentioned.

In this event, should the truck bolster be in turned position, as seen in Fig. 11, the lugs 17 will engage with the guide flanges 19 and thus serve to maintain the rocker in true rolling relation. Said trunnions and guideways or guide flanges 19 are assisted in this contingency by the end walls 13 of the runways 11 which will engage with the sides of the rockers, as seen in Fig. 11. In order to afford clearance for said end walls 13, the sides of the rockers are cut or recessed, as seen in the several views.

In order to allow for insertion of the upper ends of the rockers into runways 10, the flanges or guideways 18 are slotted as at 20 which afford clearance for the lugs or trunnions 15. The slots 20 are of a width such as to permit of passage of said lugs when the rockers are held horizontal, said slots being however of less width than the horizontal width of said lugs when the rocker is upright, as seen in Fig. 9. This arrangement thus serves as a means for effectually locking the lugs in engagement with flanges 18 and therefore of locking the upper ends of the rockers in operative relation with the upper bearing housing.

In the form shown in Fig. 4, lugs 16 and 17 are dispensed with and in lieu thereof the rocker is formed at its upper and lower bearing faces with spaced conical teeth 22 which are adapted for engagement with spaced openings or perforations 23 provided for the reception thereof in the bottom of each runway 10 and 11. The arrangement is such, as will be seen, that the teeth 22 coöperating with openings or perforations 23, will serve to hold the rockers and bearing housing in true rolling relation during relative pivotal movement of the body and truck bolsters. In this form the rockers are formed with laterally projecting lugs or trunnions 15' substantially triangular in cross section which project through openings 21 of trochoidal shape formed in the side walls 12 of the bearing housing 8, said openings 21 constituting guideways for the lugs or trunnions 15' and performing the same function as the flanges 18 of the form first described.

The rockers or anti-friction bearing members are unsymmetrical in form of different dimensions at different diameters, the effective diameter of each rocker being least when the rocker is in upright position, as shown in Figs. 7 and 8, or when the body bolster is in central position and the truck bolster is in straight-ahead position. In this position of the rocker the engaging surfaces at the upper and lower sides thereof contact with the bearing surfaces of the housings 8 and 9 at the points $a$, as seen in Figs. 7 to 11 inclusive. When the rocker rocks or rolls transversely in one direction so that the points $b$ thereof engage with the bearing surfaces of the bearing housings 8 and 9, the effective diameter of the rocker remains the same as before, the entire edge along $b$ at each side of the rocker being a true curve so that the effective diameter of the rocker will remain the same in the rocking or rolling of the rocker with said edges thereof contacting with the bearing surfaces of housings 8 and 9. When the rocker is rocked transversely in the other direction, however, so that the points $c$ thereof contact with the bearing surfaces of the bearing housings, the effective diameter of the rocker will be increased to preferably about one-quarter inch. As the rocker rolls from this position longitudinally in either direction so that the points $d$ thereof contact with the bearing surfaces of the bearing housings, the effective diameter of the rocker will be gradually decreased so that when the limit of rocking in this direction is reached, the effective diameter will be approximately one-eighth inch less than when the rocker was positioned with the points $c$ thereof engaging with the bearing surfaces of the bearing housings. If the rocker is now rocked transversely to vertical position so that the points $e$ engage with the bearing surfaces of the bearing housings and said rocker is then rocked in a vertical plane to upright position or to the initial position thereof in which the points $a$ contact with the bearing surfaces of the bearing housings, the effective diameter will again be gradually decreased in the course of the rocking described until the minimum effective diameter is again reached which is the case when the rocker is in upright position.

In use the rockers coöperating with opposite sides or ends of the car truck are oppositely arranged so that the points $b$ at the upper sides of the rockers are remote and so that the points $b$ at the under sides of the rockers are adjacent. With the rockers thus arranged it will be seen that in the event of the elevation of one side of the truck such as occurs through elevation of one of the rails of a track just preceding a curve in the track, such elevation will cause the body of the car or the body bolster to shift laterally by gravity, as clearly seen in Fig. 5, the rocker permitting of course of such transverse shifting. In this transverse shifting, however, the rockers at the lower side of the track or the side toward which the car body shifts, will affect the elevation of this side of the car body and body bolster, relatively to the truck bolster 4, the vertical position of the opposite side of the car body and body bolster relatively to the truck bolster remaining unchanged. With the car body and body bolster in this position, the rockers at the side which has been elevated relatively to the truck bolster will be in a position in which the effective diameter of said rockers is the greatest, the inclination of said rockers being of course to rock by gravity to a position in which the effective daimeter of the same is the least. The arrangement as above described is such that in the pivoting of the truck bolster with said rockers in transversely rocked positions, just mentioned, the effective diameter of said rockers will be gradually decreased. This being the case, the weight of the car or gravity acting upon said rockers, will be utilized to assist in the pivoting of the truck bolster and hence of the truck when the curve in the track is reached. With the truck bolster or truck in turned position, the rockers at the one side of the same are still in a position in which the effective diameter of the same, though reduced, is not the minimum effective diameter of said rockers so that as a straight portion of track is again reached, in which the truck bolster is turned to straight-ahead position and in which therefore, the rockers are rocked longitudinally to vertical or normal position, gravity will again be utilized in its influence upon said rockers to effect movement to a position in which the minimum effective diameter is reached, and thus will facilitate turning of the truck bolster and truck to straight-ahead position. It will thus be seen that with the construction set forth, the elevation of one of the rails of a railway track, such as is provided, preceding a curve in the track, will be utilized to slightly elevate one side of the car body and body bolster so that gravity acting upon said car body and bolster and said parts in turn, upon the rockers, will be utilized to facilitate turning of the truck as the curve in the track is reached and to facilitate return turning of the truck as a straight portion of the track is reached. This being the case the frictional resistance occasioned through contact of the flanges of the truck wheels with the sides of the track rails is materially reduced with a result of requiring materially less power or pull to draw the cars along the track.

Each of the rocker bearings is formed at its underside at the location $a$ with a flat spot, as seen in the several views and particularly in Fig. 12 which is adapted to serve to yieldingly hold the rocker in upright position and hence the bolsters normally in central, straight-ahead position. When the truck is on a straight track it has but little movement, there being usually about one and one-half inch of forward and back play permitted at the wheel flanges. The centering or lifting action of the bearing must, therefore, be positive and quick at the start in order to be effective in keeping the truck straight. Since the gradually changing curvature in the lifting surface of the rocker will not do this, the flat spot above referred to is provided.

Projecting inwardly from the inner sides of the bearing housings are plain bearing surfaces 24 and 25 adapted, upon reduction of the rockers through wear, or upon removal of said rockers, to engage with each other and thus serve to maintain the body and truck bolsters in operative relation although the bearing rockers are removed or are ineffective because of reduction through wear or disabling.

In order to allow for the desired rocking or rolling action of the bearing rockers in the relative pivoting and shifting of the body and truck bolsters, above described, the inner and outer sides of said rockers are recessed, and side walls 12 of the rocker runways are flared, as clearly seen in Figs. 8 and 10. Also, the runways are of curved formation with the center of curvature coincident with that of the pivotal axis of the truck bolster, the end walls 13 of the rocker runways being radially disposed in order to effectively engage with the sides of the rockers and thus serve as guides or centering means when the upper bearing housing is lifted, as is the case when the car body tips or tilts. Also, in order to permit of the desired longitudinal and transverse rocking of the rocker bearing members, the upper and lower sides of said members, that is the portions thereof which contact with the bearing surfaces of the bearing housings, are made of greatest width at the central portions thereof, and decreasing in width toward their ends, as clearly shown in Fig. 12. With this formation of the upper and lower sides or bearing portions of the rocker, the sides or longitudinal edges of said portions, in the longitudinal and lateral tilting or rocking of said rockers, will pass in close proximity to the side walls of the bearing housings or runways, so as to guide said rockers in this movement, but at the same time, so as to not interfere with free movement in this manner.

I have used the words "rollers" and "rockers" interchangeably and the words "rotary" and "rocking" to describe the movement of the former, interchangeably, inasmuch as it is thought that so far as the construction in question is concerned, the two are synonymous, rollers and rockers having the same movement, differing only in the degree or length of movement, and rotary and rocking action describing the same movement except that by rocking action, one ordinarily has in mind a shorter movement than a rotary action. Therefore, the word "rotatable" as used in the claims is not intended necessarily to mean that the member described makes a complete revolution, but it is intended to include such a rocking motion as may be necessary to perform the required function.

While I have illustrated and described the preferred forms of construction for carrying my invention into effect, these are capable of variation and modification without departing from the spirit of the invention. I, therefore, do not wish to be limited to the precise details of constructions set forth, but desire to avail myself of such variations and modifications as come within the scope of the appended claims.

Having described my invention what I claim as new and desire to secure by Letters Patent is:

1. In a car mounting, a truck; a car body pivotally mounted thereon to permit turning of the truck relatively thereto; and means interposed between said body and truck arranged to cause the weight of the car to effect turning of the truck relatively to the car body upon change in elevation of one side of the truck, substantially as described.

2. In a car mounting, a truck; a car body pivotally mounted thereon to permit turning of the truck relatively thereto; and means interposed between said body and truck arranged to cause the weight of the car to effect turning of the truck relatively to the car body upon elevation of one side of the truck, substantially as described.

3. In a car mounting, a truck; a car body pivotally mounted thereon to permit turning of the truck relatively thereto; and bearing means interposed between said body and truck arranged to cause the weight of the car to effect turning of the truck relatively to the car body upon change in elevation of one side of the truck, substantially as described.

4. In a car mounting, a truck; a car body pivotally mounted thereon to permit turning of the truck relatively thereto; and bearing means interposed between said body and truck arranged to cause the weight of the car to effect turning of the truck relatively to the car body upon elevation of one side of the truck, substantially as described.

5. In a vehicle truck, the combination of body and truck bolsters connected together so as to permit of relative pivotal and lateral movement; upper and lower bearing surfaces on said body and truck bolster respectively; and an anti-friction bearing member interposed between said surfaces and having rolling contact therewith, said bearing member being of different dimensions at different diameters, whereby, upon relative lateral movement in one direction from central position, of said body bolster, when the truck is in straight-ahead position, one end of said body bolster will be elevated, substantially as described.

6. In a vehicle truck, the combination of body and truck bolsters connected together so as to permit of relative pivotal and lateral movement; upper and lower bearing surfaces on said body and truck bolster respectively; an anti-friction bearing member interposed between said surfaces and having rolling contact therewith, said bearing member being of different dimensions at different diameters, whereby, upon relative lateral movement in one direction from central position, of said body bolster, when the truck is in straight-ahead position, one end of said body bolster will be elevated; and means on said body bolster for elevating said bearing member when the body bolster lifts, substantially as described.

7. In a vehicle truck, the combination of body and truck bolsters connected together so as to permit of relative pivotal and lateral movement; upper and lower bearing surfaces on said body and truck bolsters respectively; and an anti-friction bearing member interposed between said surfaces and having rolling contact therewith, said bearing member being of different dimensions at different diameters whereby, upon relative lateral movement, in one direction from central position, of said body bolster, when the truck is in straight-ahead position, said body bolster will be elevated, substantially as described.

8. In a vehicle truck, the combination of body and truck bolsters connected together so as to permit of relative pivotal and lateral movement; upper and lower bearing surfaces on said body and truck bolsters respectively; and an anti-friction bearing member interposed between said surfaces and having rolling contact therewith, said bearing member being of different dimensions at different diameters whereby, upon relative lateral movement, in one direction from central position, of said body bolster, when the truck is in straight-ahead position, said body bolster will be elevated, and whereby, upon subsequent turning of the truck, said body bolster will be gradually lowered, substantially as described.

9. In a vehicle truck, the combination of body and truck bolsters connected together so as to permit of relative pivotal and lateral movement; upper and lower bearing surfaces on said body and truck bolsters respectively; and an anti-friction bearing member interposed between said surfaces and having rolling contact therewith, said bearing member being of different dimensions at different diameters whereby, upon relative lateral movement, in one direction from central position, of said body bolster, when the truck is in straight-ahead position, said body bolster will be elevated, and whereby, upon subsequent turning of the truck, said body bolster will be gradually lowered, and whereby, upon subsequent return of the body bolster to central position and return pivoting of said truck to straight-ahead position, said body bolster will still be further gradually lowered, substantially as described.

10. In a car, the combination of a body bolster, a truck bolster, and a side bearing rocker member disposed between said bolsters, said rocker member having a substantially arcuate bearing surface shaped so as to elevate said body bolster when said bolsters are shifted pivotally relatively to each other and when shifted laterally relatively to each other, said rocker bearing member being provided with a flat spot at the middle thereof for positively centering said truck bolster, substantially as described.

11. In a car, the combination of a body bolster, a truck bolster, a side bearing rocker member disposed between said bolsters, said rocker member being unsymmetrical in form so as to elevate said body bolster when said bolsters are shifted pivotally relatively to each other and when shifted laterally relatively to each other, triangular trunnions on said bearing rocker member, and means providing trunnionways for coöperating with said trunnions to prevent the displacement of said bearing rocking member.

12. In a car, the combination of a body bolster, a truck bolster, a side bearing rocker member disposed between said bolsters, said rocker member being unsymmetrical in form so as to elevate said body bolster when said bolsters are shifted pivotally relatively to each other and when shifted laterally relatively to each other, triangular trunnions on said bearing rocker member, and means providing trunnionways for coöperating with said trunnions to prevent the displacement of said bearing rocker member, said trunnionways being of substantially trochoidal shape and corresponding to the path of movement of the lowermost point of said trunnions.

13. In a car truck, the combination of body and truck bolsters connected together so as to permit of relative pivotal and horizontal movement; upper and lower bearing surfaces on said body and truck bolsters respectively; and anti-friction bearing members at opposite sides of said truck interposed between said bearing surfaces and having rolling contact therewith, the effective diameter of said bearing members, at each side of the truck, varying at different positions of said bearing members, said diameter being smallest when the truck bolster is in central, straight-ahead position, relative to said body bolster, and said diameter increasing when said truck bolster pivots in either direction or moves laterally, substantially as described.

14. In a car truck, the combination of body and truck bolsters connected together so as to permit of relative pivotal and horizontal movement; upper and lower bearing surfaces on said body and truck bolsters respectively; anti-friction bearing members at opposite sides of said truck interposed between said bearing surfaces and having rolling contact therewith, the effective diameter of said bearing members, at each side of the truck, varying at different positions of said bearing members, said diameter being smallest when the truck bolster is in central, straight-ahead position, relative to said body bolster, and said diameter increasing when said truck bolster pivots in either direction or moves laterally in one direction; and a flat spot on each of said bearing members for engagement with corresponding bearing surfaces when the truck bolster is in central, straight-ahead position, substantially as described.

15. In a car truck, the combination of body and truck bolsters connected together so as to permit of relative pivotal and horizontal movement; upper and lower bearing surfaces on said body and truck bolsters respectively; and anti-friction bearing members at opposite sides of said truck interposed between said bearing surfaces and having rolling contact therewith, the effective diameter of said bearing members, at each side of the truck, varying at different positions of said bearing members, said diameter being smallest when the truck bolster is in central, straight-ahead position, relative to said body bolster, and said diameter increasing when said truck bolster pivots in either direction or moves laterally in one direction, and whereby, in the movement of the truck bolster from laterally shifted, straight-ahead position, pivotally, then laterally to central turned position, and then pivotally to central, straight-ahead position, the effective diameter of the bearing members at one side of the bolster will gradually decrease, substantially as described.

16. In a car truck, the combination of body and truck bolsters connected together so as to permit of relative pivotal and horizontal movement; upper and lower bearing surfaces on said body and truck bolsters respectively; and anti-friction bearing members at opposite sides of said truck interposed between said bearing surfaces and having rolling contact therewith, the effective diameter of said bearing members, at each side of the truck, varying at different positions of said bearing members, said diameter being smallest when the truck bolster is in central, straight-ahead position, relative to said body bolster, and said diameter increasing when said truck bolster pivots in either direction or moves laterally in one direction, and whereby, in the movement of the truck bolster from laterally shifted, straight-ahead position, pivotally, then laterally to central turned position, and then pivotally to central, straight-ahead position, the effective diameter of the bearing members at one side of the bolster will gradually decrease, and the effective diameter of the bearing members at the other side of the bolster, during said movement of the latter, will be unchanged in the initial pivoting of the truck bolster from laterally shifted straight-ahead position, said diameter increasing when the truck bolster is shifted to central turned position, and gradually decreasing when said truck bolster is then pivoted to central, straight-ahead position, substantially as described.

17. In a vehicle truck, the combination of body and truck bolsters connected together so as to permit of relative pivotal and lateral movement; upper and lower side bearing surfaces on said body and truck bolsters respectively; anti-friction bearing members interposed between said bearing surfaces and having upper and lower bearing portions having rolling contact with said bearing surfaces; and side and end walls extending from said surfaces and inclosing the upper and lower portions of said bearing members, said portions of said bearing members being narrower at the ends than in the middle, substantially as described.

18. In a vehicle truck, the combination of body and truck bolsters connected together so as to permit of relative pivotal and lateral movement; upper and lower side bearing surfaces on said body and truck bolsters respectively; anti-friction bearing members interposed between said bearing surfaces and having upper and lower bearing portions having rolling contact with said bearing surfaces; and side and end walls extending from said surfaces and inclosing the upper and lower portions of said bearing members, said bearing members having concave inner and outer sides, substantially as described.

19. In a vehicle truck, the combination of body and truck bolsters connected together so as to permit of relative pivotal and lateral movement; upper and lower side bearing surfaces on said body and truck bolsters respectively; anti-friction bearing members interposed between said bearing surfaces and having upper and lower bearing portions having rolling contact with said bearing surfaces; and side and end walls extending from said surfaces and inclosing the upper and lower portions of said bearing members, said portions of said bearing members being narrower at the ends than in the middle, and said bearing members having concave inner and outer sides, substantially as described.

20. In a bearing device, the combination of upper and lower bearing surfaces vertically movable and longitudinally shiftable the one with relation to the other; anti-friction bearing members interposed between said bearing surfaces and having rolling contact therewith; means for maintaining the true rolling relation of said rollers with respect to said bearing members upon vertical movement of said bearing members from each other, said means comprising walls extending from said bearing surfaces toward each other; guide flanges on said upper walls; and lateral projecting lugs on said bearing members adapted for engagement with the inner and outer sides of said flanges, said flanges being slotted to permit of passage of certain of said lugs, substantially as described.

21. In a bearing device, the combination of upper and lower bearing surfaces vertically movable and longitudinally shiftable the one with relation to the other; anti-friction bearing members interposed between said bearing surfaces and having rolling contact therewith; means for maintaining the true rolling relation of said rollers with respect to said bearing members upon vertical movement of said bearing members from each other, said means comprising walls extending from said bearing surfaces toward each other; guide flanges on said upper walls; and laterally projecting lugs on said bearing members adapted for engagement with the inner and outer sides of said flanges, said flanges being slotted to permit of passage of certain of said lugs, and said last mentioned lugs, when said bearing members are in operative position, presenting portions for contact with said flanges of greater width than said slots, substantially as described.

22. In a car, the combination of truck and body bolsters connected together so as to permit of relative sidewise and pivotal movement of the car and truck; an upper bearing member carried by said body bolster and having trunnionways therein; a lower bearing member carried by said bolster; and a rocker having trunnions coöperating with said trunnionways, said rocker bearing being unsymmetrical in form so as to yieldingly resist relative sidewise movement of the car and truck, substantially as described.

23. In a car, the combination of truck and body bolsters connected together so as to permit of relative sidewise and pivotal movement of the car and truck; an upper bearing member carried by said body bolster and having trunnionways therein; a lower bearing member carried by said truck bolster; and a rocker having trunnions coöperating with said trunnionways, said rocker-bearing being unsymmetrical in form so as to yieldingly resist relative sidewise movement of the car and truck, said trunnionways comprising track surfaces shaped to conform to the paths of said trunnions, substantially as described.

24. In a car, the combination of a body bolster; a truck bolster; and a rolling bearing member disposed between said bolsters, said bearing member having a substantially arcuate bearing surface with a flat spot at the middle thereof substantially as and for the purpose set forth.

25. In a car, the combination of a body bolster; a truck bolster; and a side bearing rocker member disposed between said bolsters, said rocker member having a substantially arcuate bearing surface shaped so as to elevate said body bolster when said bolsters are shifted pivotally relatively to each other and when shifted laterally relatively to each other, said rocker bearing member being provided with a flat spot at the middle thereof for centering said bolsters, substantially as described.

26. In a car mounting, a truck; a car body pivotally mounted thereon to permit turning of the truck relatively thereto; and bearing means interposed between the body and truck permitting lowering of the body upon turning of the truck relatively thereto, substantially as described.

27. In a car mounting, a truck; a car body pivotally mounted thereon to permit turning of the truck relatively thereto; and rotatable bearing means interposed between the body and the truck permitting lowering of the body upon turning of the truck, substantially as described.

28. In a car mounting, a truck; a car body pivotally mounted thereon to permit turning of the truck relatively thereto; and a rocker interposed between said body and truck, the bearing faces of said rocker being broader at the center than at the ends, substantially as described.

29. In a bearing device, the combination with upper and lower bearing housings movable longitudinally one with relation to the other and movable vertically and having plain bearing faces, a bearing member interposed between said faces and adapted to have rolling engagement therewith, guides formed on the housings, said guides on the upper housing having parallel inner and outer guiding surfaces, bosses formed on the bearing member adapted for engagement with the outer guiding surfaces of both housing guides for maintaining the bearing member in operative position when the housings move longitudinally, and separate bosses formed on the bearing member adapted to engage the inner guiding surfaces of the upper housing guide for maintaining the bearing member in operative position when the housings are moved vertically.

30. In a bearing device, the combination of upper and lower bearing housings, a bearing member interposed between said housings adapted to have rolling engagement therewith, oppositely disposed guides formed on the housings, the guides of the upper housing comprising ribs, the inner face of the ribs of the upper housing forming guide faces parallel with said outer faces, lugs formed on the bearing member adapted to engage said faces to maintain the bearings in operative rolling position, and an opening formed in the ribs of the upper housing for the insertion of the inner guide engaging lugs.

31. In a bearing device, the combination with upper and lower bearing housings, a bearing member interposed between said housings and adapted to have rolling engagement therewith, pockets formed in the side walls of the upper housing, projections on the bearing member projecting into the pockets, the inner face of the walls of the pocket forming downwardly converging guide faces adapted to engage the projections of the bearing member to maintain said bearing member in operative position when said housings are moved longitudinally and when moved vertically.

32. In a car mounting, a truck; a car body on said truck; a bearing housing on said truck; a bearing member in said housing and having plain bearing surfaces, said bearing member being arranged to automatically assume, under the influence of gravity, a central position therein; coöperating guides on the sides of said bearing member and lower housing permitting rolling movement of said bearing member; and an operative engagement between said car body and said bearing member, substantially as described.

33. In a car mounting, a truck; a car body on said truck; a bearing housing on said truck; a bearing member in said housing and having plain bearing surfaces, said bearing member being arranged to automatically assume, under the influence of gravity, a central position in said housing; laterally extending trunnions on the lower portion of said bearing member; and guides on the side walls of said housing coöperating with said trunnions to permit rolling movement of said bearing member, substantially as described.

34. In a car mounting, a truck; a car body on said truck; a bearing housing on said truck; a bearing member in said housing and having plain bearing surfaces, said bearing member being arranged to automatically assume, under the influence of gravity, a central position in the said housing; a laterally extending trunnion on each side of the lower central portion of said bearing member; and guides on the side walls of said housing coöperating with said trunnions to permit rolling movement of said bearing member, substantially as described.

35. In a car mounting, a truck; a car body on said truck; opposed bearing housings on said body and truck; a bearing member interposed between said housings and having plain bearing surfaces, said bearing member being arranged to automatically assume, under the influence of gravity, a central position in the lower housing; coöperating guides on the sides of said bearing member and lower housing permitting rolling movement of said bearing member; and coöperating means on the upper portion of said bearing member and the upper housing arranged to carry the upper portion of said bearing member along when said upper housing lifts and turns, substantially as described.

36. In a car mounting, a truck; a car body on said truck; opposed bearing housings on said body and truck; a bearing member interposed between said housings and having plain bearing surfaces, said bearing member being arranged to automatically assume, under the influence of gravity, a central position in the lower housing; laterally extending trunnions on the lower portion of said bearing member; guides on the side walls of said lower housing coöperating with said trunnions to permit rolling movement of said bearing member; and coöperating means on the upper portion of said bearing member and the upper housing arranged to carry the upper portion of said bearing member along when said upper housing lifts and turns, substantially as described.

37. In a car mounting, a truck; a car body on said truck; opposed bearing housings on said body and truck; a bearing member interposed between said housings and having plain bearing surfaces, said bearing member being arranged to automatically assume, under the influence of gravity, a central position in the lower housing; a laterally extending trunnion on each side of the lower central portion of said bearing member; guides on the side walls of said lower housing coöperating with said trunnions to permit rolling movement of said bearing member; and coöperating means on the upper portion of said bearing member and the upper housing arranged to carry the upper portion of said bearing member along when said upper housing lifts and turns, substantially as described.

38. In a bearing device, the combination with upper and lower bearing housings, a bearing member interposed between said housings and adapted to have rolling engagement therewith, pockets formed in the side walls of the upper housing, projections on the bearing member projecting into the pocket, the inner face of the walls of the pocket forming downwardly converging guide faces adapted to engage the projections of the bearing member to maintain said bearing member in operative position when said housings are moved longitudinally and when moved vertically.

39. In a bearing device, the combination with upper and lower bearing housings, a bearing member interposed between said housings and adapted to have rolling engagement therewith, guides formed on the side walls of the housings having oppositely disposed guide faces, bosses formed on the bearing member adapted for engagement with said faces for maintaining the bearing member in operative position when said housings move longitudinally, pockets formed in the guides of the upper housing, and separate bosses on the bearing member adapted to engage the inner walls of said pockets to maintain the bearing member in operative position when the housings are moved vertically.

40. In a bearing device, the combination with upper and lower bearing housings, a bearing member interposed between said housings and adapted to have rolling engagement therewith, guides formed on the side walls of the housings having oppositely disposed guide faces, bosses formed on the bearing member adapted for engagement with said faces for maintaining said bearing member in operative position when said housings move longitudinally, pockets with downwardly converging side walls formed in the guides of the upper housing, the converging side walls of the pocket uniting at a point substantially midway between said first faces, and separate bosses on the bearing member projecting into said pockets adapted to suspend the bearing member when the upper housing moves vertically.

41. In a bearing device the combination of upper and lower bearing members; a rotatable member interposed between said bearing members; guide flanges on one of said bearing members, the opposite sides of said flanges being substantially parallel to each other and constituting retaining surfaces; and laterally extending lugs on said rotatable members projecting on opposite sides of said flanges to engage said retaining surfaces, substantially as described.

42. In a bearing device the combination of upper and lower bearing members; a rotatable member interposed between said bearing members; converging flanges on one of said bearing members; and laterally extending lugs on said rotatable member, one lug being arranged between said flanges and the other lugs being arranged on the outer sides thereof, substantially as described.

43. In a bearing device the combination of upper and lower bearing members; a rotatable member interposed between said bearing members; converging flanges on one of said bearing members; and a laterally extending lug on said rotatable member arranged between said converging flanges, substantially as described.

44. In a bearing device the combination of upper and lower bearing members; a rotatable member interposed between said bearing members; converging flanges on one of said bearing members; and a laterally extending lug on said rotatable member arranged between said converging flanges, there being an entry notch in said flanges permitting insertion of said lug, substantially as described.

45. The combination of a bearing housing; a rotatable member operating therein; flanges on the sides of said housing adjacent the sides of said rotatable member; and lugs on the sides of said rotatable member arranged between and on the outer sides of said flanges, substantially as described.

46. The combination of a bearing housing; a rotatable member operating therein; converging flanges on the sides of said housing adjacent the sides of said rotatable member; and lugs on the sides of said rotatable member arranged between said converging flanges, substantially as described.

47. The combination of a bearing housing; a rotatable member operating therein; converging flanges on the sides of said housing adjacent the sides of said rotatable member; and lugs on the sides of said rotatable member arranged between said converging flanges, there being entry notches in said flanges to permit of insertion of said lugs, substantially as described.

48. The combination of a bearing housing; a rotatable member operating therein; a pair of converging flanges on each side of said housing adjacent each side of said rotatable member, there being entry notches in said flanges; and three lugs on each side of said rotatable member, the central of each set of lugs being arranged between said flanges and the outer of each set of lugs being arranged outside of said flanges, each central lug being arranged and adapted to pass through the notch in the corresponding flanges, substantially as described.

In testimony whereof I have signed my name to this specification in the presence of two subscribing witnesses.

ELMYR A. LAUGHLIN.

Witnesses:
JOSHUA R. H. POTTS,
HELEN F. LILLIS.